(12) United States Patent
Petratto

(10) Patent No.: US 7,090,427 B2
(45) Date of Patent: Aug. 15, 2006

(54) BAR CONNECTING CLAMP

(75) Inventor: Giorgio Petratto, Venaria Reale (IT)

(73) Assignee: Petratto S.r.l., (IT)

( * ) Notice: Subject to any disclaimer, the term of this patent is extended or adjusted under 35 U.S.C. 154(b) by 0 days.

(21) Appl. No.: 10/783,992

(22) Filed: Feb. 20, 2004

(65) Prior Publication Data
US 2004/0258472 A1 Dec. 23, 2004

(30) Foreign Application Priority Data
Feb. 21, 2003 (IT) .......................... TO2003A0130

(51) Int. Cl.
*F16B 7/04* (2006.01)
(52) U.S. Cl. .................... 403/400; 403/188; 403/385; 403/389; 403/391; 198/860.1; 198/860.3; 198/861.1; 101/407.1
(58) Field of Classification Search .............. 403/188, 403/384, 385, 389, 391, 400; 248/65; 198/860.1, 198/860.3, 861.1; 101/228, 407.1, 474, 475
See application file for complete search history.

(56) References Cited

U.S. PATENT DOCUMENTS

| | | | | |
|---|---|---|---|---|
| 2,088,890 A | * | 8/1937 | Winby et al. ............... 403/188 |
| 3,011,235 A | * | 12/1961 | Pacheco ..................... 172/776 |
| 3,861,816 A | * | 1/1975 | Zaidan ...................... 403/385 |
| 4,171,838 A | * | 10/1979 | Grundy ..................... 403/391 |
| 4,289,417 A | * | 9/1981 | Mandell .................... 403/218 |
| 6,536,982 B1 | * | 3/2003 | Gibbons et al. ............. 403/97 |
| 2001/0054545 A1 | * | 12/2001 | Csiki et al. ............... 198/860.1 |

* cited by examiner

*Primary Examiner*—Daniel P. Stodola
*Assistant Examiner*—Michael P. Ferguson
(74) *Attorney, Agent, or Firm*—ZITO tlp; Joseph J. Zito; Kendal M. Sheets

(57) ABSTRACT

A clamp for connecting together a set of structural bars having a body defining at least one pair of prismatic guides for positioning one of the bars within the clamp and a locking mechanism for securing the bars inside the guides. The body is defined by four sheet metal plates arranged parallel and facing each other in pairs of two, each pair of two arranged perpendicular to the other such that each pair is connected to the other collectively along four parallel edges of the body. The prismatic guides are each defined by a pair of aligned seats formed along respective sides of each pair of facing plates.

10 Claims, 2 Drawing Sheets

BAR CONNECTING CLAMP

BACKGROUND OF THE INVENTION

The present invention relates to a bar connecting clamp.

The invention may preferably be used, though not exclusively, for connecting bars supporting tools on folding-gluing machines employed in the graphics industry (hereinafter referred to simply as "graphic machines"), to which the following description refers purely by way of example.

Graphic machines normally comprise a conveying surface on which blanks of sheet paper material are conveyed successively; and a number of tools suspended over the conveying surface, and which interact with the blanks for conveyance purposes (pressure rollers) or to perform various processing operations (folding, gluing, etc.). By varying the type, number and sequence of the tools, more or less complex paper articles can be obtained, such as folders with one or more pockets, CD holders, etc.

In one known solution, the tools are supported on vertical bars, in turn fixed to horizontal bars suspended over the conveying surface and fixed directly or indirectly to the machine structure. In one known solution, the horizontal and vertical bars are connected by clamps comprising a substantially parallelepiped-shaped body in which prismatic guides are machined with the same cross section as the bars for connection; and pressure screws are screwed into the body to lock the bars longitudinally inside the respective seats.

One problem of known clamps is high cost, on account of the machining involved and the large amount of waste material removed in the form of chips during machining. Another problem is the need for clamps with guides of different sections for different types of bars, which further increases overall tooling cost.

SUMMARY OF THE INVENTION

It is an object of the present invention to provide a clamp of the type briefly described above, designed to eliminate the aforementioned problems typically associated with known clamps.

According to the present invention, there is provided a clamp as depicted in the drawings and described in detail in reference thereto hereunder.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
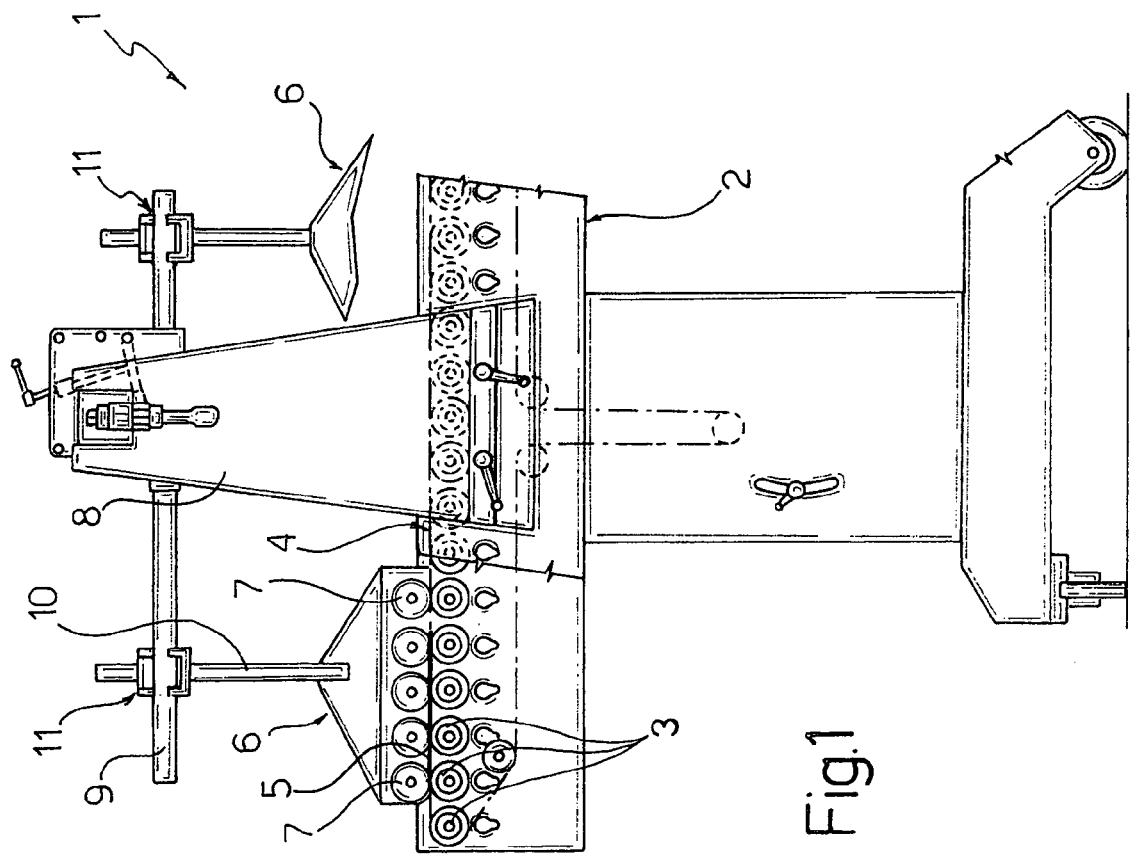
FIG. 1 shows a partly sectioned, partial side view of a graphic machine featuring clamps according to the invention.

Number 1 in FIG. 1 indicates as a whole a folding-gluing machine employed in the graphics industry.

Machine 1 comprises a fixed supporting structure 2; a number of powered rollers 3 defining a conveying surface 4, on which blanks 5 of sheet paper material are conveyed successively; and a number of tools 6 suspended over the conveying surface and which interact with blanks 5.

By way of example, FIG. 1 shows a pressure tool 6 comprising a number of idle rollers 7 which cooperate elastically with blanks 5 to keep them in contact with, and ensure conveyance of the blanks by, rollers 3 of the conveying surface. Machine 1 is normally equipped with processing tools (not shown) for processing (folding, gluing, etc.) blanks 5; and, by varying the type, number and sequence of the tools, various types of processing operations can be performed on the blanks to obtain more or less complex articles. Tools 6, however, are not described in detail, by not forming part of the invention.

Structure 2 of the machine is fitted with supporting gantries 8 (only one shown) from which tools 6 are suspended by a number of bars 9, 10 connected to one another to form appropriate supporting beams. More specifically, the bars include horizontal bars 9 fitted to gantries 8 and extending longitudinally with respect to conveying surface 4; and vertical bars 10 supporting tools 6 and fixed to bars 9 by clamps 11 constituting the object of the invention.

Figure 2:
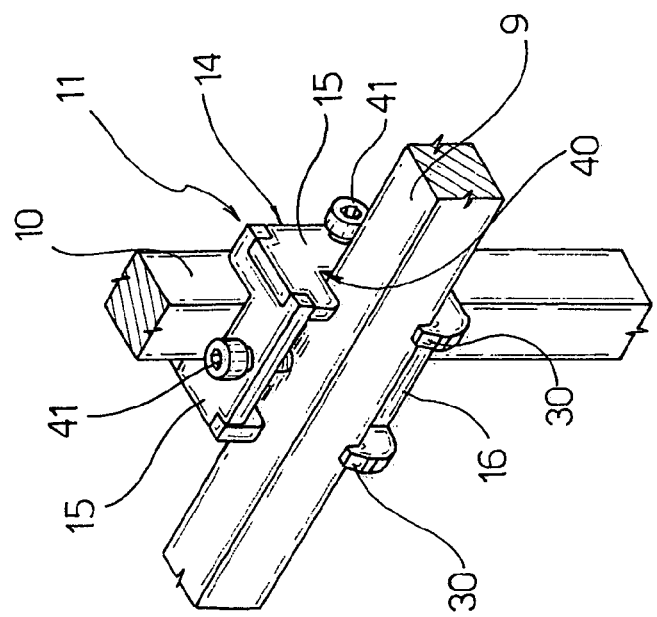
FIG. 2 shows a top view in perspective of a clamp in accordance with the invention used to connect two bars.
Figure 3:
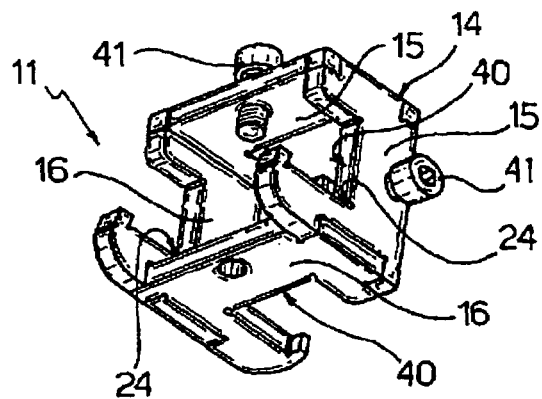
FIG. 3 shows a bottom view in perspective of the clamp according to the invention.
Figure 4:
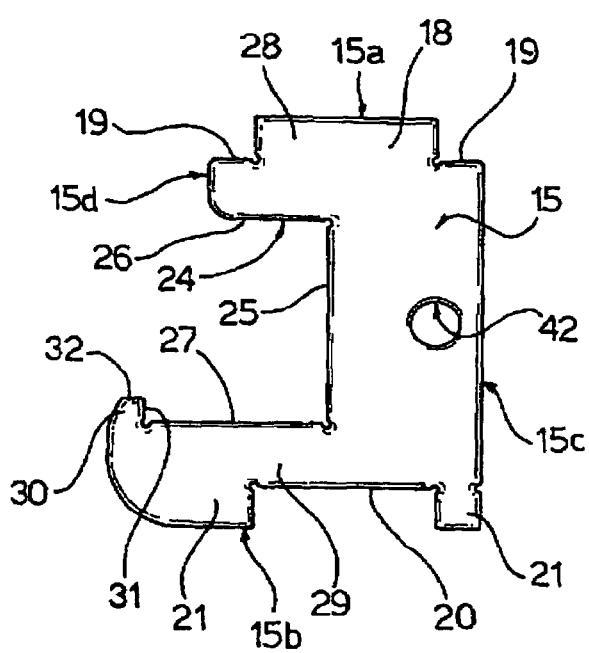
FIGS. 4 and 5 show front views of respective details of the FIG. 2 and 3 clamp.
Figure 5:
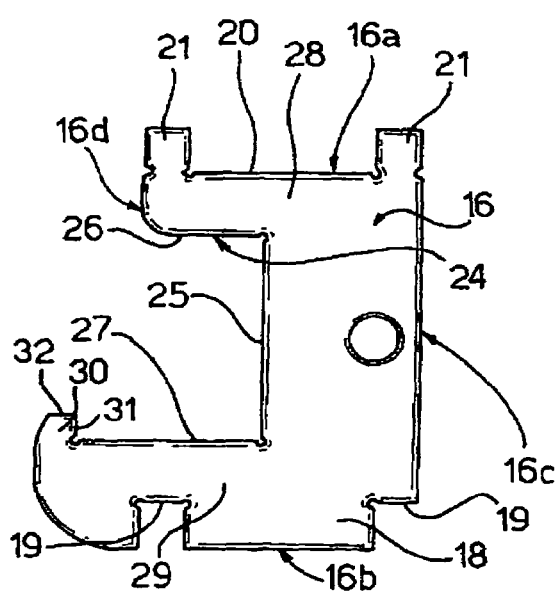

FIGS. 2 and 3 show a clamp 11 in accordance with the invention. Clamp 11 comprises a hollow, substantially parallelepiped-shaped body 14 open at two opposite faces and defined by four plates 15, 16 arranged parallel in twos and defining respective faces of the body. Plates 15, 16 are conveniently formed by laser cutting relatively thick, e.g. 5 mm, sheet steel.

Plates 15, 16 are identical in twos, and substantially in the form of an asymmetrical C. Each plate 15, 16 has a first and second opposite side 15a, 15b and 16a, 16b shaped to fit to complementary sides of the adjacent plates to form the edges of body 14 of the clamp. More specifically, sides 15a, 16b each have a central rectangular projection 18 defined laterally by two recesses 19 of a depth equal to the thickness of the plates; and sides 15b, 16a each have a central recess 20 of a depth equal to the thickness of the plates, of a width equal to that of projections 18, and defined laterally by two shoulders 21 complementary to recesses 19.

Each plate 15, 16 also has a substantially straight third side 15c, 16c; and a concave polygonal fourth side 15d, 16d forming a quadrangular seat 24 for a bar 9 or 10. Each seat 24 is defined by a back edge 25 parallel to the third side 15c, 16c, and by two lateral edges 26, 27 parallel to each other and defining, with the first and second side 15a, 15b, 16a, 16b, respective asymmetrical portions 28, 29 of the relative plate. More specifically, each portion 28 projects from back edge 25 by a length smaller than a first side of the corresponding bar; and each portion 29 projects from back edge 25 by a length greater than the first side of the corresponding bar 9 or 10, and terminates with a retaining tooth 30 facing inwards of seat 24 and defined towards back edge 25 by a side 31 separated from edge 25 by a distance equal to the first side of the bar. Tooth 30 has an end surface 32 separated from the inner edge 26 of portion 28 by a distance, measured parallel to back edge 25, at least equal to a second side of the bar to permit transverse insertion of the bar.

Plates 15 form two adjacent faces of body 14, and are assembled with seats 24 facing opposite ways; similarly, plates 16 form the other two adjacent faces of body 14, and are assembled with seats 24 facing opposite ways; and seats 24 of opposite plates 15, 16 are located on the same side of body 14 and aligned with each other to form a prismatic guide 40 for a respective bar 9 or 10. The prismatic guides 40 formed by the two pairs of opposite plates 15, 16 are perpendicular to each other and on opposite sides of body 14.

Clamp 11 also has two pressure screws 41 screwed inside corresponding holes 42 in plates 15 to grip bars 9 and 10, in use, against respective edges 27 of seats 24.

Plates 15, 16 are conveniently connected by conventional or laser welding techniques.

Clamp 11 operates as follows.

Each bar 9, 10 can be inserted transversely into relative guide 40 between teeth 30 and edges 26 of the relative seats 24 defining the guide. Once inserted, bar 9, 10 is locked transversely, with substantially no clearance, between teeth 30 and back edges 25 of seats 24, so that screws 41 need simply be screwed down to lock bars 9, 10 against edges 27.

The advantages of clamps 11 according to the present invention will be clear from the foregoing description. In particular, clamps 11 are produced cheaply and easily from sheet metal plates 15, 16 with a minimum of waste material. Moreover, laser cutting provides for accurately cutting relatively complex shapes, such as those defined by the sides of plates 15, 16, with no high-cost re-machining required.

Finally, the dimensions of plates 15, 16, and in particular of seats 24, may vary to accommodate bars 9, 10 of different sizes and so obtain series of different low-cost clamps 11.

Clearly, changes may be made to clamps 11 without, however, departing from the scope of the accompanying Claims. In particular, seats 24 of plates 15, 16 may differ, in which case, the four plates also differ from one another.

The invention claimed is:

1. A clamp for connecting bars, comprising:
   a body having at least a first and second prismatic guide for engaging said bars and means for locking said bars inside said guides;
   characterized in that said body is defined by a first pair of separate planar sheet metal plates arranged parallel and spaced apart and facing each other, and a second pair of planar sheet metal plates arranged parallel and spaced apart and facing each other, the plates of said first pair being perpendicular to the plates of said second pair, said plates being connected substantially along the edges of said body; and
   each of said plates each having a first and second connection end, said connection ends being opposite to each other on said plates and extending substantially along respective corners of said body, and having a third and fourth free end, said free ends being opposite to each other on said plates, said third free ends of said plates facing in a same first direction and said fourth free ends of said plates facing a same second direction, said first and second directions being opposite each other; and
   each of said connection ends being configured with complementary, engageable shapes with respect to said opposing connection ends; and
   each plate of said first pair having its first and second connection ends engaged with respective connection ends of respective plates of said second pair; wherein
   said plates of said first pair comprise recesses along their respective third ends and face one another to form said first prismatic guide of said body; and
   said plates of said second pair comprise recesses along their respective fourth ends and face one another to form said second prismatic guide of said body.

2. A clamp as claimed in claim 1, characterized in that said plates are identical in each pair of two.

3. A clamp as claimed in claim 2, characterized in that the two identical plates of each pair are adjacent to each other, with the relative seats on opposite sides of said body.

4. A clamp for connecting bars, comprising: a body defining at least one pair of prismatic guides for respective said bars; and
   means for locking said bars inside said guides;
   characterized in that said body is defined by four separate planar sheet metal plates arranged parallel, spaced and facing in pairs of two, and connected substantially along the edges of said body;
   said guides each being defined by a pair of aligned seats formed along respective sides of two respective facing plates, said plates each having a first and second opposite side extending along said edges of the body and shaped to fit to respective sides of the adjacent plates having a complementary shape; and
   characterized in that said plates are asymmetrically C-shaped, and each comprises two portions of different lengths extending from opposite sides of said seat;
   said seat being defined by a back edge and by respective inner edges of said portions.

5. A clamp as claimed in claim 4, characterized in that the longer of said portions terminates with a tooth facing inwards of the seat and having a side separated from said back edge by a distance equal to the length of a first side of the respective said bar, and an end surface separated from the inner edge of the other portion by a distance at least equal to the length of a second side of the bar.

6. A folding-gluing machine for manufacturing paper articles comprising:
   a supporting structure;
   a conveying surface for successively conveying blanks;
   a number of blank processing tools connectable to said supporting structure, over said conveying surface, by means of a number of bars; and
   at least one clamp for connecting said bars, said clamp comprising:
   a body having at least a first and second prismatic guide for engaging said bars and means for locking said bars inside said guides;
   characterized in that said body is defined by a first pair of separate planar sheet metal plates arranged parallel and spaced apart and facing each other, and a second pair of planar sheet metal plates arranged parallel and spaced apart and facing each other, the plates of said first pair being perpendicular to the plates of said second pair, said plates being connected substantially along the edges of said body; and
   each of said plates each having a first and second connection end, said connection ends being opposite to each other on said plates and extending substantially along respective corners of said body, and having a third and fourth free end, said free ends being opposite to each other on said plates, said third free ends of said plates facing in a same first direction and said fourth free ends of said plates facing a same second direction, said first and second directions being opposite each other; and
   each of said connection ends being configured with complementary, engageable shapes with respect to said opposing connection ends; and
   each plate of said first pair having its first and second connection ends engaged with respective connection ends of respective plates of said second pair; wherein said plates of said first pair comprise recesses along their respective third ends and face one another to form said first prismatic guide of said body; and said plates of said second pair comprise recesses along their respective fourth ends and face one another to form said second prismatic guide of said body.

7. A clamp for connecting bars, comprising:

a body having at least one pair of prismatic guides for engaging said bars and means for locking said bars inside said guides;

characterized in that said body is defined by four separable, planar sheet metal plates arranged parallel, spaced apart and facing each other in pairs of two to define respective pairs of facing plates, and connected substantially along the edges of said body in pairs of two to define respective pairs of first and second adjacent plates;

wherein each of said first and second adjacent plates comprises a first and a second end, said ends being opposite to each other;

each of said ends being configured with complementary, engagable shapes with respect to said opposing end, and one of said ends of said first adjacent plate engaging said respective complementary opposing end of said second adjacent plate to form said edges;

said guides each being defined by a pair of aligned seats formed along respective sides of two respective facing plates; and characterized in that said plates are asymmetrically C-shaped, and each comprises two portions of different lengths extending from opposite sides of said seat;

said seat being defined by a back edge and by respective inner edges of said portions.

8. A clamp as claimed in claim 7, characterized in that the longer of said portions terminates with a tooth facing inwards of the seat and having a side separated from said back edge by a distance equal to the length of a first side of the respective said bar, and an end surface separated from the inner edge of the other portion by a distance at least equal to the length of a second side of the bar.

9. A clamp for connecting bars, comprising:

a body having at least one pair of prismatic guides for engaging said bars and means for locking said bars inside said guides;

characterized in that said body is defined by four separable, planar sheet metal plates arranged parallel, spaced apart and facing each other in pairs of two to define respective pairs of facing plates, and connected substantially along the edges of said body in pairs of two to define respective pairs of first and second adjacent plates;

wherein each of said first and second adjacent plates comprises a first and a second end, said ends being opposite to each other;

each of said ends being configured with complementary, engagable shapes with respect to said opposing end, and one of said ends of each of said first adjacent plates engaging said respective complementary opposing end of each of said second adjacent plates to form said edges;

a pair of prismatic guides formed within each pair of facing plates, said pairs of guides each being defined by a pair of aligned seats formed along respective sides of two respective facing plates; and characterized in that said plates are structurally identical in each pair of two.

10. A clamp as claimed in claim 9, characterized in that the two identical plates of each pair are adjacent to each other, with the relative seats on opposite sides of said body.

* * * * *